US010564708B2

(12) United States Patent
Lingutla et al.

(10) Patent No.: US 10,564,708 B2
(45) Date of Patent: *Feb. 18, 2020

(54) OPPORTUNISTIC WAKING OF AN APPLICATION PROCESSOR

(71) Applicant: Apple Inc., Cupertino, CA (US)

(72) Inventors: Varaprasad V. Lingutla, Cupertino, CA (US); Cyril De La Cropte De Chanterac, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 15/952,608

(22) Filed: Apr. 13, 2018

(65) Prior Publication Data

US 2018/0299946 A1 Oct. 18, 2018

Related U.S. Application Data

(63) Continuation of application No. 14/731,311, filed on Jun. 4, 2015, now Pat. No. 9,958,933.

(51) Int. Cl.
*G06F 1/32* (2019.01)
*H04W 52/02* (2009.01)
(Continued)

(52) U.S. Cl.
CPC .......... *G06F 1/3296* (2013.01); *G06F 1/3206* (2013.01); *G06F 1/329* (2013.01);
(Continued)

(58) Field of Classification Search
CPC .... G06F 1/3296; G06F 1/3206; G06F 1/3287; G06F 1/329; H04W 52/0209;
(Continued)

(56) References Cited

U.S. PATENT DOCUMENTS 5,621,903 A 4/1997 Luciw
5,944,778 A 8/1999 Takeuchi
(Continued)

FOREIGN PATENT DOCUMENTS

CN 102811127 A 12/2012
TW I337495 5/2008
TW 200836064 9/2008

OTHER PUBLICATIONS

Search Report (ROC) Taiwan Patent Application No. 103117038, dated Jan. 1, 2016, 1 page.
(Continued)

*Primary Examiner* — Kenneth M Lo
*Assistant Examiner* — Chad G Erdman
(74) *Attorney, Agent, or Firm* — Womble Bond Dickinson (US) LLP

(57) ABSTRACT

Described herein in various embodiments are techniques to better coordinate long wakeup events on a network processor that are due to radio or network activity with the long wakeups that are due to requests from an application processor. In one embodiment, power management logic can receive wake requests from system processes upon notice that one or more application processors are transitioning into a low power state. The power management logic can coalesce the wake requests based on a supplied margin and determine a wake timeframe in which the application processor may be opportunistically woken from the low power state. The power management logic can provide the wake timeframe for the application processor to a network processor in the system. The network processor can opportunistically cause an early wake of the application processor during the wake timeframe.

20 Claims, 10 Drawing Sheets

(51) Int. Cl.
*G06F 1/3296* (2019.01)
*G06F 1/3287* (2019.01)
*G06F 1/329* (2019.01)
*G06F 1/3206* (2019.01)

(52) U.S. Cl.
CPC ...... *G06F 1/3287* (2013.01); *H04W 52/0209* (2013.01); *Y02D 10/171* (2018.01); *Y02D 10/24* (2018.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/24* (2018.01); *Y02D 70/26* (2018.01)

(58) Field of Classification Search
CPC ...... Y02D 10/171; Y02D 10/24; Y02D 70/00; Y02D 70/1242; Y02D 70/1262; Y02D 70/142; Y02D 70/144; Y02D 70/164; Y02D 70/166; Y02D 70/24; Y02D 70/26
See application file for complete search history.

(56) References Cited

U.S. PATENT DOCUMENTS

| | | | |
|---|---|---|---|
| 7,133,941 B2 | 11/2006 | Klein et al. | |
| 7,885,616 B2 | 2/2011 | Plestid et al. | |
| 8,020,161 B2 | 9/2011 | Markov | |
| 8,244,946 B2 | 8/2012 | Gupta et al. | |
| 8,260,996 B2 | 9/2012 | Wolfe | |
| 8,504,753 B2 | 8/2013 | Danko | |
| 8,630,213 B2 | 1/2014 | Lee et al. | |
| 8,914,081 B2 | 12/2014 | Zhu et al. | |
| 8,954,632 B2 | 2/2015 | Wang et al. | |
| 9,128,475 B2 | 9/2015 | Barth | |
| 2002/0178282 A1 | 11/2002 | Mysore | |
| 2003/0008690 A1 | 1/2003 | Guterman | |
| 2003/0212631 A1 | 11/2003 | Kerr | |
| 2005/0125573 A1 | 6/2005 | Klein | |
| 2007/0022238 A1 | 1/2007 | Metsker | |
| 2007/0271401 A1 | 11/2007 | Louzoun | |
| 2008/0045277 A1 | 2/2008 | Plestid | |
| 2008/0066070 A1 | 3/2008 | Markov et al. | |
| 2008/0147946 A1 | 6/2008 | Pesavento | |
| 2008/0235424 A1 | 9/2008 | Lee | |
| 2009/0183157 A1 | 7/2009 | Tran | |
| 2009/0307715 A1 | 12/2009 | Santamaria et al. | |
| 2010/0077394 A1 | 3/2010 | Wang | |
| 2010/0111066 A1* | 5/2010 | Mehta | H04W 52/0216 370/345 |
| 2010/0153765 A1 | 6/2010 | Stemen et al. | |
| 2010/0169683 A1 | 7/2010 | Wang | |
| 2010/0274940 A1 | 10/2010 | Ahmad et al. | |
| 2011/0158144 A1 | 6/2011 | Sung et al. | |
| 2011/0244792 A1 | 10/2011 | Park et al. | |
| 2012/0291035 A1 | 11/2012 | Barth | |
| 2013/0080816 A1* | 3/2013 | Johnson | G06F 1/3206 713/401 |
| 2013/0157707 A1 | 6/2013 | Hsiao et al. | |
| 2013/0210481 A1 | 8/2013 | Sane | |
| 2013/0297832 A1 | 11/2013 | Ahmad | |
| 2013/0325995 A1 | 12/2013 | Ispas et al. | |
| 2014/0068303 A1* | 3/2014 | Hildebrand | H04W 52/0254 713/323 |
| 2014/0095752 A1 | 4/2014 | Cheshire | |
| 2014/0237279 A1 | 6/2014 | Muralidhar et al. | |
| 2014/0189162 A1 | 7/2014 | Wang et al. | |
| 2014/0195839 A1 | 7/2014 | Chueh et al. | |
| 2014/0201411 A1 | 7/2014 | Kumar | |
| 2014/0215236 A1* | 7/2014 | Heinrich | G06F 1/329 713/320 |
| 2014/0215238 A1 | 7/2014 | Heinrich et al. | |
| 2014/0344819 A1 | 11/2014 | Kumar | |
| 2014/0344820 A1 | 11/2014 | Kumar | |
| 2016/0157092 A1 | 6/2016 | Uy | |

OTHER PUBLICATIONS

PCT Chapter I International Preliminary Report on Patentability (IPRP Chapter I) PCT/US2014/035306 dated Nov. 17, 2015. (6 Pages).
PCT International Search Report and PCT Written Opinion of The International Searching Authority for PCT/US2014/035306 dated Jul. 31, 2014.
David Solomon and Mark Russinovich, Windows Internals Part 1, (6$^{th}$ Edition), Microsoft Press, http://infoman.teikav.edu.gr/~stpapad/WindowsInternalsPart16thEdition.pdf, 2012, 298 pages.
Mark Russinovich, David A. Solomon, Alex Ionescu, "Windows Internals Part 1 6$^{th}$ Edition", Mar. 21, 2012, pp. i-276, XP055101190.
Microsoft Corporation: "Windows Timer Coalescing", Windows Hardware Dev Center Archive, Jan. 20, 2009, pp. 1-9, XP002727534.
PCT Chapter I International Preliminary Report on Patentability (IPRP Chapter I) PCT/US2016/023278 dated Dec. 14, 2017 (11 pages).
PCT/US2016/023278 Notification of Transmittal of the International Search Report and the Written Opinion of the International Searching Authority, or the Declaration dated Jun. 8, 2016, 15 pages.

* cited by examiner

OPPORTUNISTIC WAKING OF AN APPLICATION PROCESSOR

This application is a continuation of U.S. application Ser. No. 14/731,311, filed Jun. 4, 2015.

BACKGROUND OF THE DISCLOSURE

Electronic devices may be power managed such that components of the device enter a low power 'sleep' state when the component is idle. Allowing devices to enter a low power state may result in an overall reduction of power consumption for the device, which can be of particular importance for battery-operated devices or other devices designed for low power operation. To enter the low power state, one or more clock signals to the component may be slowed or stopped. Additionally one or more internal regions of the component may be powered down by having supply voltage reduced or terminated. Some components may be powered off completely when not in use.

When a component in a low power sleep state is to be used, the component may be woken from the sleep state and enter an operational state to perform a set of requested operations. In general, the degree to which a component is powered down determines the length of time required for the component to return to a fully operational state, as the successively deeper sleep states require the restoration of power and state information to a successively larger number of internal regions of the component.

SUMMARY OF THE DESCRIPTION

Described herein, in various embodiments, are techniques to coordinate long wakeups that are due to radio or network activity with the long wakeups that are due to requests from an application processor. This coordination can reduce the number of long wakeups by wireless network processors within the device, resulting in an overall reduction in device energy consumption. In some circumstances, system responsiveness can be improved due to the pre-emptive coordination of wireless network processor and application processor power cycles.

A summary of certain embodiments disclosed herein is set forth below. It should be understood that these aspects are presented to provide the reader with a brief summary of these certain embodiments. The aspects described below are not intended to limit the scope of this disclosure. The various features of the embodiments may be variously combined with some features included and others excluded to suit a variety of different applications.

One embodiment provides for a computer implemented method comprising notifying one or more processes of a data processing system that at least one of the one or more processors is to transition to a low power state; receiving one or more wake requests from the one or more processes to indicate a period in which to wake the at least one processor; determining a wake timeframe by coalescing the one or more wake requests; and notifying a network processor of the wake timeframe, wherein the network processor is to wake the at least one processor upon waking from a low power state within the wake timeframe of the at least one processor.

One embodiment provides for a data processing system comprising one or more application processors; a wireless network processor coupled with the one or more application processors, where the wireless network processor is to process network data on behalf of the one or more application processors; and power management logic to determine a wake timeframe for the one or more application processors, communicate the wake timeframe to the wireless network processor, and cause the one or more application processors to transition to a low power state.

One embodiment provides for an electronic device comprising an application processor and a network processor. The network processor can receive a wake timeframe of the application processor, where the wake timeframe includes a scheduled wake deadline and an opportunistic timeframe. The network processor can be configured to enter and wake from a low power state and, upon waking from the low power state, to determine whether a current time is within the wake timeframe of the application processor. The network processor, upon a determination that the current time is within the opportunistic timeframe can cause the application processor to wake from a low power state prior to the scheduled wake deadline.

One embodiment provides for a non-transitory machine-readable medium storing instructions which, when performed by one or more processors of a data processing system, cause the one or more processors to perform operations comprising notifying one or more processes of the data processing system that at least one of the one or more processors is to transition to a low power state; receiving one or more wake requests from the one or more processes to indicate a period in which to wake the at least one processor; determining a wake timeframe by coalescing the one or more wake requests; and notifying a network processor of the wake timeframe, wherein the network processor is to wake the at least one processor upon waking from a low power state within the wake timeframe of the at least one processor.

The above summary does not include an exhaustive list of all aspects of the present invention. It is contemplated that the invention includes all devices, systems, and/or methods that may be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements, and in which.

DETAILED DESCRIPTION

Figure 1:
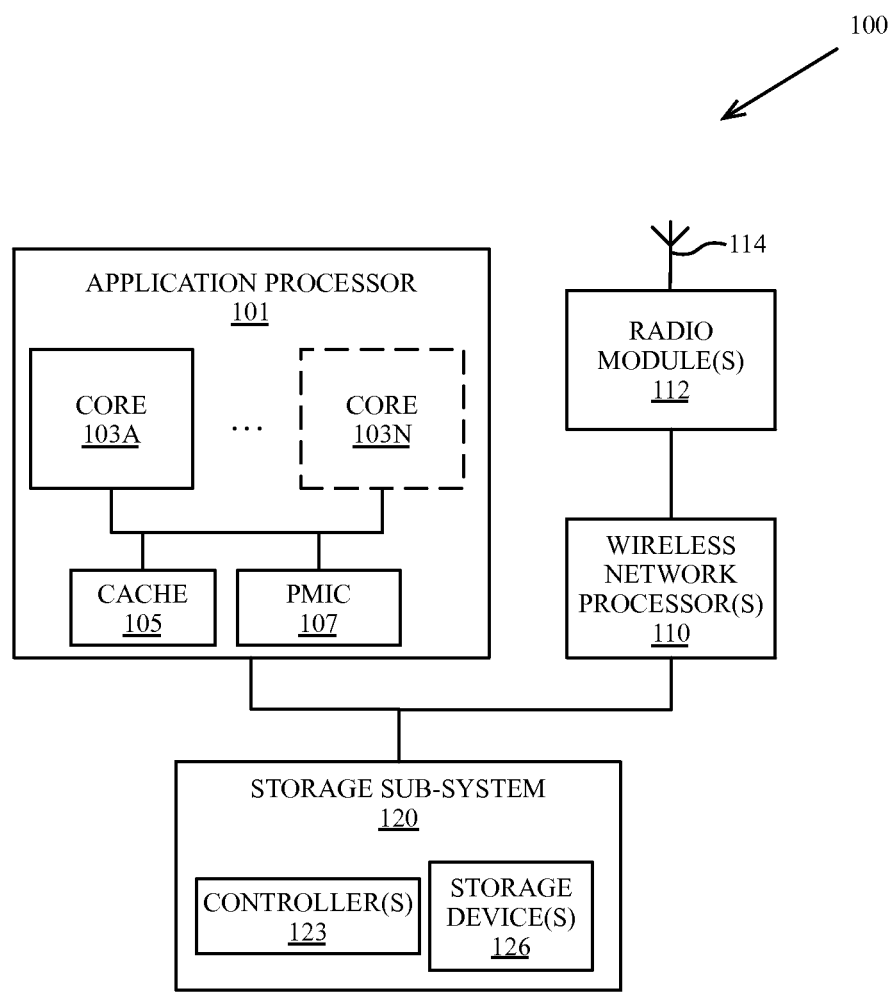
FIG. 1 is a block diagram of a data processing system having an application processor and one or more wireless network processors, according to an embodiment.

For some components, waking from a particularly deep sleep state can introduce a noticeable amount of overall system latency. This latency can include the wake time of the component, as well as the latency imposed on other components in a device that rely on the sleeping component for services. In addition to wake latency imposed on the system, some components may consume additional power when resuming from a sleep state. Accordingly, it may be beneficial to reduce the number of sleep/wake cycles. For example, wireless network processors such as wireless baseband processors for cellular or other forms of wireless wide area networks (WWAN), as well as wireless LAN (WLAN) processors typically experience many sleep/wake cycles within a given period. Often these wakes are short, low power wakeups that do not require the use of a device application processor. The wireless network processor can wake from a low power state to check status with a wireless base station, such as a cellular tower or wireless access point. The network processor can then decode headers for incoming data to determine if an action or response is required. If no action or response is required, the wireless network processor can return to a low power state. These low power wakes can last for a few seconds and occur frequently, but do not consume a significant amount of power.

Under some circumstances a wakeup may result in the network processor having to stay awake for a longer period of time to transmit or receive data. These longer, higher power wakeups are more energy intensive than the short, low power wakeups. Some long wakeups are the result of independent network activity, such as network connection maintenance or transitioning between base stations (e.g., cellular towers, access points, etc.), which may result in the network processor being awake for a longer period of time than the short wakeups but do not involve the use of an application processor within the device. These higher power wakes happen irregularly and can occur more frequently if the device is in motion or frequently changes location.

In one embodiment, a computing device is configured such that an application processor of the device can transition to a low power sleep state when idle and then wake from the sleep state perform actions. If an action is to be performed at a known future time, a timer can be configured to wake the processor to perform the action. The timer can have a margin or leeway that defines an acceptable time window in which the wakeup may be performed (e.g., +/−5 minutes around the scheduled time). If the scheduled event requires the use of the wireless network processor while the network processor is in a low power state, the network processor can be transitioned into an active state to perform the network task. These network tasks that are performed at the request of an application processor (e.g., downloading email, performing backup operations, downloading social media updates) may be an additional source of long wakeups for the network processor.

Described herein in various embodiments are techniques to coordinate long and/or high power wakeup events at a network processor at that caused by radio or network activity with long wakeups that are due to requests from an application processor. This coordination can reduce the number of wakeups by network processors within the device, resulting in an overall reduction in device energy consumption. In some circumstances, system responsiveness can be improved due to the pre-emptive coordination of network processor and application processor power cycles.

In one embodiment, power management logic, such as a power management process of a device operating system, can receive wake requests from system processes upon notice to the processes that one or more application processors are transitioning into a low power state. The wake requests can include a wake time, which is a time in which the process would like to wake the application processor to perform a task, a margin or leeway that defines how long the power management logic is allowed to delay expiration of the timer, and a list of resources that the process will use to execute the future task, such as audio, video, or network resources. The power management logic can coalesce the timers based on the supplied margin and determine a wake timeframe in which the application processor may be opportunistically woken from the low power state. The power management logic can then supply the wake timeframe to the processors or device components that supply the requested resources requested by the process.

For example, if a process presents a wake request that names a wireless network resource (e.g., cellular, WI-FI, Bluetooth, etc.), the power management logic can communicate the wake timeframe to the appropriate network processor device. Should the network processor perform a long, high power wake during the wake timeframe to respond to an independent network event, the network processor can opportunistically wake the application processor to perform the tasks that are scheduled to be performed within the wake timeframe. This prevents the scenario in which the network processor performs a long wakeup to perform network connection activities and returns to a low power state, only to be immediately woken by the application processor to perform the scheduled multitasking requests.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Numerous specific details are described herein to provide a thorough understanding of various embodiments of the present invention. However, in certain instances, well-known or conventional details are not described in order to provide a concise discussion of the various embodiments.

System Overview

FIG. 1 is a block diagram of a data processing system 100 having an application processor 101 and one or more wireless network processors 110, according to an embodiment. In one embodiment, the system 100 can be employed within a desktop, laptop, handheld, or tablet computing device. The system 100 can also be employed within a server, smartphone, personal digital assistant, music playing device, gaming device, or any other device that can execute multiple processes.

In one embodiment, the application processor 101 includes one or more cores 103A-N, a cache 105, and a power management integrated circuit (PMIC) 107. The application processor 101 can be coupled with one or more wireless network processors 110, such as a WI-FI, cellular, or Bluetooth processor. The wireless network processors can couple with one or more separate radio modules 112, or may share a combined radio module. The one or more radio modules 112 can couple with a common antenna 114, or each have separate antennas.

The one or more network processors 110 and the application processor 101 can each couple with a storage sub-system 120. The storage sub-system 120 can store instructions and data for processing by the application processor 101 or for transmission over a wireless network via the network processor 110. The storage sub-system 120 can also store instructions and data received over the wireless network. The storage sub-system 120 can include one or more controllers 123 to provide access to one or more storage devices 126, which store the instructions and data. In one embodiment the controllers 123 include a flash memory controller for managing access to one or more storage devices 126 based on flash memory (e.g., NAND, NOR), or another electrically erasable semiconductor memory device, including an array of devices as employed in a solid state drive (SSD). In one embodiment, the one or more controllers 123 can include a hard disk drive (HDD) controller for managing access to one or more HDD storage devices 126.

In one embodiment the one or more network processors 110 includes internal memory to store instructions and data. The instructions and data can enable the network processor 110, in one embodiment, to run a separate and distinct operating system that differs from the operating system that executes on the application processor 101. For example, the network processor 110 may be configured to execute a real time operating system (RTOS) configured to process network data in real-time (e.g., without significant delay).

In various embodiments the one or more wireless network processors 110 support multiple power states and can transition into a low power state when idle. In one embodiment, at least one of the one or more wireless network processors 110 also supports discontinuous reception (e.g., DRx), in which a wireless network processor and a network negotiate the phases in which data transfers occur. Wireless LAN and wireless mobile (e.g., cellular) network standards support various forms of discontinuous reception. When data transfer is not occurring, the radio modules 112 and/or some or all components of the one or more wireless network processors 110 may transition into a low power state. A paging or polling mechanism can be used to allow a wireless base station to indicate if there is any network data available to be received. The one or more wireless network processors 110 can then enter a sleep/wake cycle in which short, low power wakes are performed to check for network data, while longer, higher power wakes are performed to receive data.

While receiving data may, at some point, involve the use of the application processor 101, some of the longer and higher power wakes can be performed entirely by an individual wireless network processor without the use of the application processor 101, such as when a mobile device transitions between wireless access points or wireless mobile network base stations. Allowing the one or more wireless network processors 110 to perform certain activities without involving the application processor may result in reduced power consumption when the application processor 101 is in a low power mode, as well as increased performance for tasks executing on the application processor 101 when the application processor is in an active state. However, if power state transitions between the application processor 101 and the one or more wireless network processor 110 are poorly aligned, system performance and energy consumption may be negatively impacted.

For example and in one embodiment, some of the one or more network processors 110 may consume a greater amount of energy when waking from a low power state than consumed during normal operation. In such embodiment, a large number of transitions between power states may result in an increase in overall power consumption within the data processing system 100. Additionally, some amount of wake-up delay can occur when transitioning a component within the data processing system 100 from a low power state to a fully operational state. Under some circumstances, misaligned power state cycles within the system 100 may introduce additional operational latency.

Opportunistic Waking by a Wireless Network Processor

In one embodiment, at least one of the one or more network processors 110 includes logic to receive and store a wake timeframe for the application processor 101 to determine if current time is within the wake timeframe defined for the application processor. The wake timeframe for an application processor is a period of time in which a scheduled activity may occur. In one embodiment, if the one or more wireless network processors 110 that are to be used for a scheduled network transaction were to wake from a low power state (e.g., during a discontinuous reception cycle) within an opportunistic wake timeframe for the application processor 101, the one or more network processors 110 can opportunistically wake the application processor 101 to perform one or more scheduled tasks associated with the wake timeframe, instead of transitioning back into a low power state.

Figure 2:
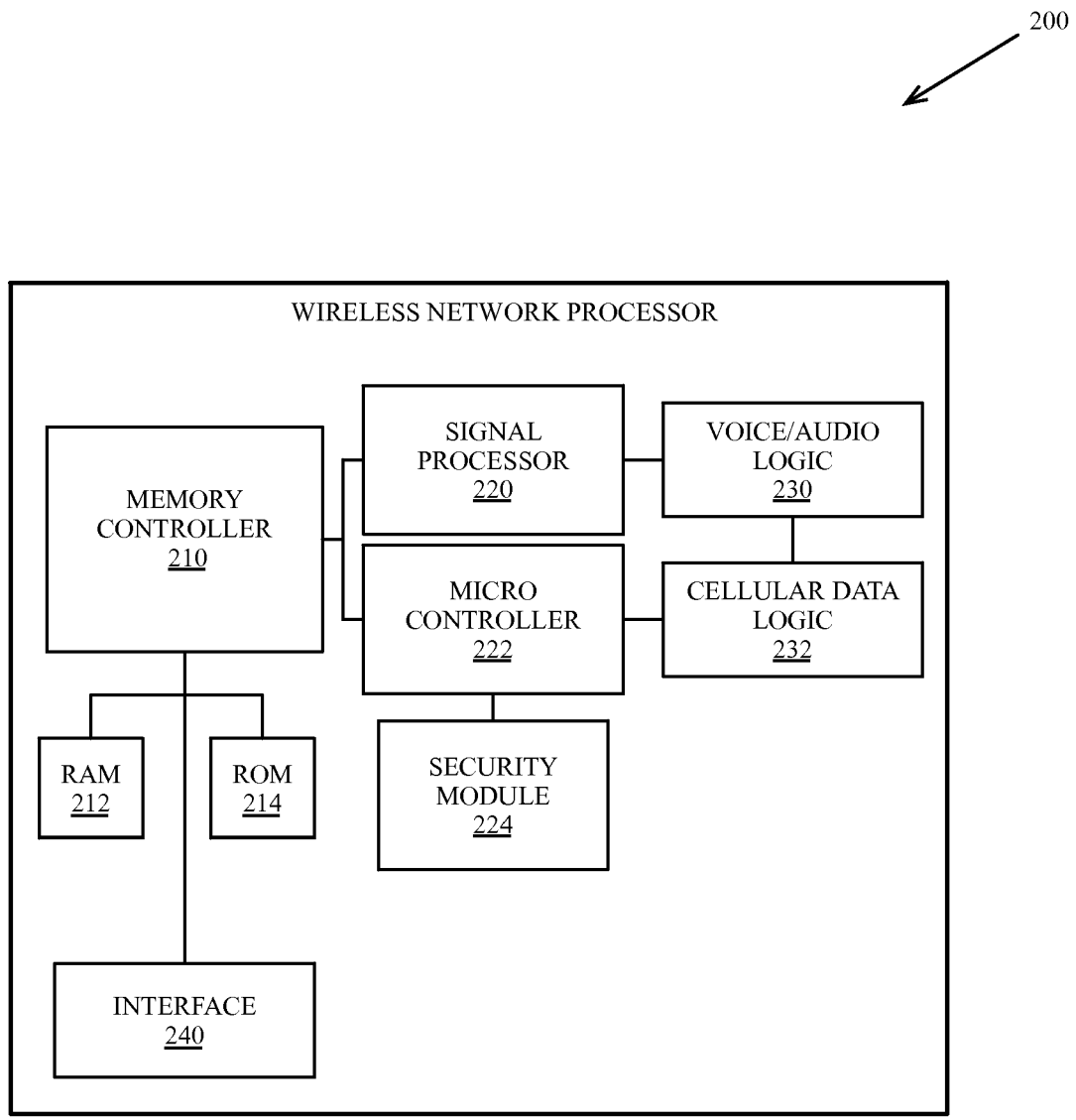
FIG. 2 is a block diagram of a wireless network processor capable of receiving opportunistic wake timeframe data, according to an embodiment.

FIG. 2 is a block diagram of a wireless network processor 200 capable of receiving opportunistic wake timeframe data, according to an embodiment. The exemplary wireless network processor 200 is a cellular baseband processor having voice/audio logic 230 for processing voice or audio transmitted over a wireless voice network, as well as cellular data logic 232 for providing mobile data connectivity, although embodiments can be configured to exclude voice functionality. The voice/audio logic 230 and cellular data logic 232 can couple with one or more of a special purpose signal processor 220 and/or a general-purpose microcontroller. The signal processor 220 and microcontroller 222 can couple with a security module 224 to provide encryption/decryption services. The signal processor 220 and microcontroller 222 can also couple with a memory controller 210, which enables access random access memory (RAM) 212 and read only memory (ROM) 214.

The ROM 214 can store a boot loading program that is executed by the microcontroller 222 at initial power-on. The boot loading program can load an operating system for the wireless network processor 200 from a non-volatile portion of RAM 212, or from external storage via an external interface 240. The operating system can then execute on the wireless network processor 200 to facilitate network access for one or more application processors that can couple to the wireless network processor via the interface 240.

While a cellular baseband processor is illustrated in FIG. 2, opportunistic wake logic employed in WI-FI and/or Bluetooth network processors can operate in a substantially similar manner, in which a wake timeframe is communicated to the wireless network processor via an interface 240. The wake timeframe can be stored in a nonvolatile portion of RAM 212, or in a volatile portion of RAM 212 that remains powered during low power states. When transitioning out of a low power state, for example, during a higher power wake cycle, the wireless network processor 200 can determine if current time is within the wake timeframe of an application processor. In one embodiment, if the wireless network processor 200 wakes within wake timeframe of the application processor and the application processor is in a low power state, the wireless network processor 200 can cause the application processor to wake from a low power state to perform tasks scheduled to be performed within the wake timeframe.

In one embodiment the wake timeframe can be communicated as a wake time and an associated leeway or allowable latency or deviation from the wake time. However, the wake timeframe can also be communicated as a start and end time, or via other methods of defining a period of time. In one embodiment, the wake time is determined relative to a commonly accessible real time clock. However, component specific timing and synchronization mechanisms may also be used.

Figure 3:
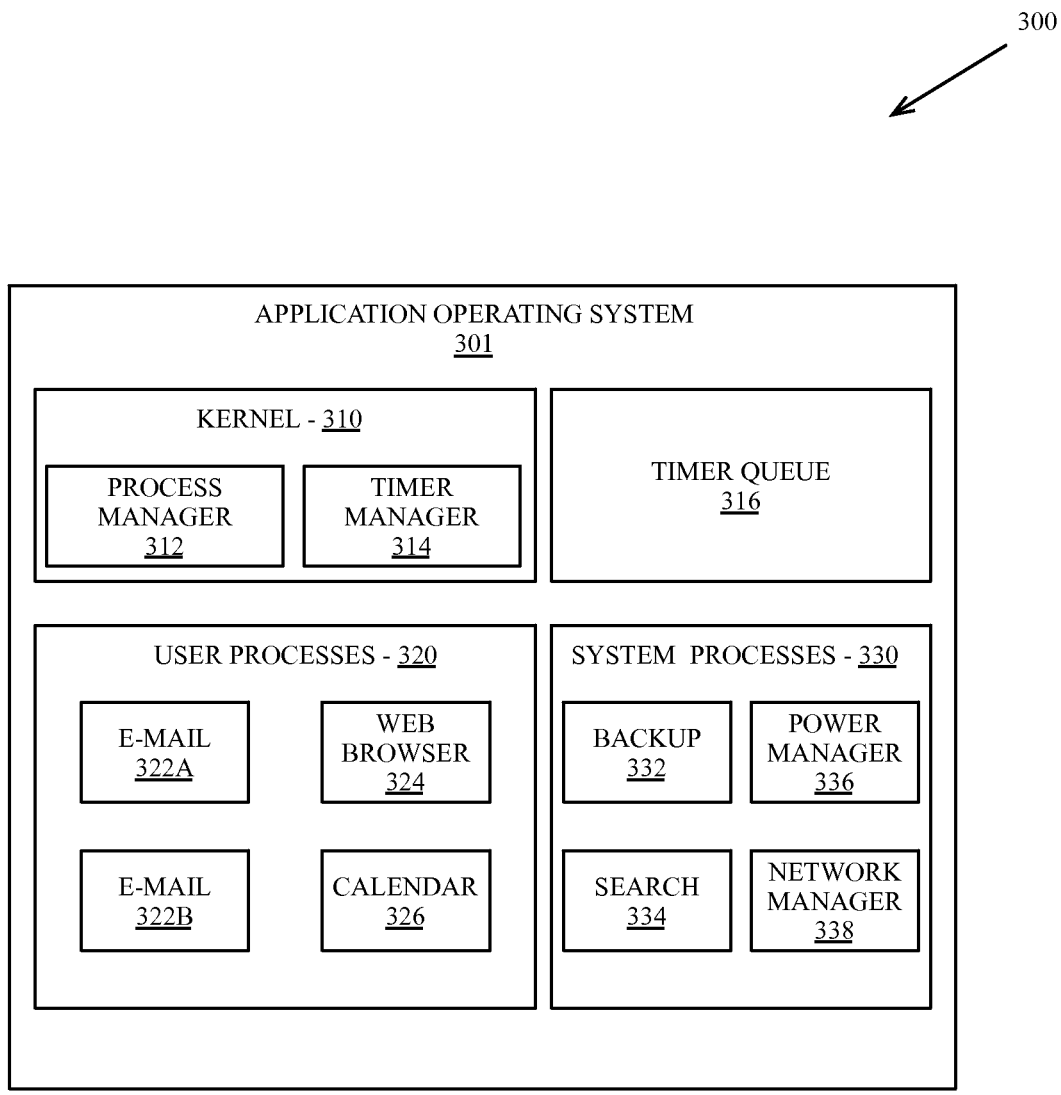
FIG. 3 is a block diagram of software architecture of a processing system having timer management capability, according to an embodiment.

FIG. 3 is a block diagram of software architecture of a processing system 300 having timer management capability, according to an embodiment. The system 300 can be configured to execute an application operating system 301 using one or more application processors, such as application processor 101 as in FIG. 1. The application operating system 301 includes a kernel 310 and a timer queue 316 and can be configured to manage the simultaneous execution of multiple user processes 320 and system processes 330. The user processes 320 and system processes 330 are instances of computer programs, tasks and/or utilities that are to be executed by an application processor. In one embodiment, the user processes 320 are associated with a user application that is executed as a result of user input. The system processes 330 can be tasks, utilities, daemons, etc., that provide one or more services to user applications or other individual system processes. Each process can include multiple threads. A thread is the smallest sequence of programmed instructions that can be managed independently by an operating system scheduler. Multiple threads within the same process can share resources, such as memory.

Exemplary user processes 320 include processes associated with e-mail 322A-B, a web browser 324, or a calendar 326. Exemplary system processes 330 include processes associated with backup 332, search 334, power manager, 336 and network manager 338 activities. A process manager 312 within the kernel 310 can manage execution state for the various processes. In one embodiment, the application operating system 301 executes the multiple processes by scheduling threads of the various processes to execute on one or more processor cores on the application processor.

In one embodiment a timer system provides the operating system 301 with a time-driven interrupt source to trigger periodic activity. In one embodiment, a timer is programmed to expire based on the interrupt interval associated with the timer. If the timer is programmed at system time 0 and has an interrupt time of 10 milliseconds, the kernel 120 would program the timer to expire at system time equals to 10 milliseconds. The timers can be digital counters that either increment or decrement at a fixed frequency, which can be configurable, and interrupt the processor upon reaching zero.

An interrupt is a signal emitted by hardware or software of a system indicating that an event is to be addressed immediately. The system responds by suspending current processing activities, saving various forms of device state, and executing an interrupt handler to handle the event. If an application processor of the device receives an interrupt while in a low power state, the application processor will transition to an operational state to handle the event.

In one embodiment, a timer manager 314 within the operating system kernel 310 manages timers at least in part using the timer queue 316. The various processes within the system can issue timer requests to the timer manager 314. The timer manager can store the timer requests in the timer queue 316 before programming timer hardware, such as a real time clock, to issue timer interrupts based on the timer requests. The timer manager 314 can scan the list of timers in the timer queue and schedule timer execution based on a timer coalescing algorithm, which rate-limits the execution of multiple timers to allow the device to maintain a low power state for a longer period of time.

In one embodiment, when an application processor within the system is preparing to enter a low power state, the power manager 336 can notify processes (e.g., user processes 320 and system processes 330) executing on the system that the application processor is preparing to enter a low power state. In response to the notice from the power manager 336, the processes can then reply to the power manager 336 indicating a requested time in which the application processor is to be transitioned out of the low power state to perform a task. For example, in response to a notice from the power manager 336 one or more of the e-mail processes 322A-B or the calendar process 326 can submit a wake request to the power manager 336.

The wake requests are to indicate that the submitting processes have one or more scheduled tasks to perform. The power manager 336 can coalesce the wake requests to determine a coalesced execution time. In one embodiment, the power manager 336 can then submit a timer request to the timer manager 314 using the coalesced execution time. The timer manager 314 can then configure a real time clock interrupt to wake the application processor if the application processor is not otherwise woken from the low power state during the wake timeframe. In one embodiment, the power manager 336 can bypass the timer manager 314 and configure a real time clock within system to generate a timer interrupt based on the coalesced execution time. In one embodiment, the power manager can receive the wake requests from the submitting processes and submit the wake requests to the timer manager 314 to be coalesced and scheduled.

In one embodiment, the wake request includes a requested time to wake, a wake margin or leeway by which the request may be adjusted, and the resources that the process will require on processor wake. The requested time to wake is a requested wake target time submitted by the requesting process. The leeway is an allowable latency for the requested time to wake and provides an explicit margin to enable the multiple wake requests to be coalesced into a single wake timeframe. The submitting processes indicate the resources required on wake to allow the power manger 336 to determine which additional devices or processors within the system to inform of the wake timeframe.

In one embodiment, the power manager 336 provides the wake timeframe to processors or devices that provide resources listed by the submitting processes. For example if one or more of the e-mail processes 322A-B submit a wake request to the power manager 336 indicating that a network resource is to be used, the power manager 336 can submit the coalesced wake timeframe to the network processor that enables the network resource. The network processor can then store the wake timeframe to use in later determinations of whether to perform an opportunistic wake of the application processor. In one embodiment, devices that provide resources other than network resources (e.g., audio, video, etc.) may also receive a wake timeframe based on the resources requested by a process.

Figure 4:
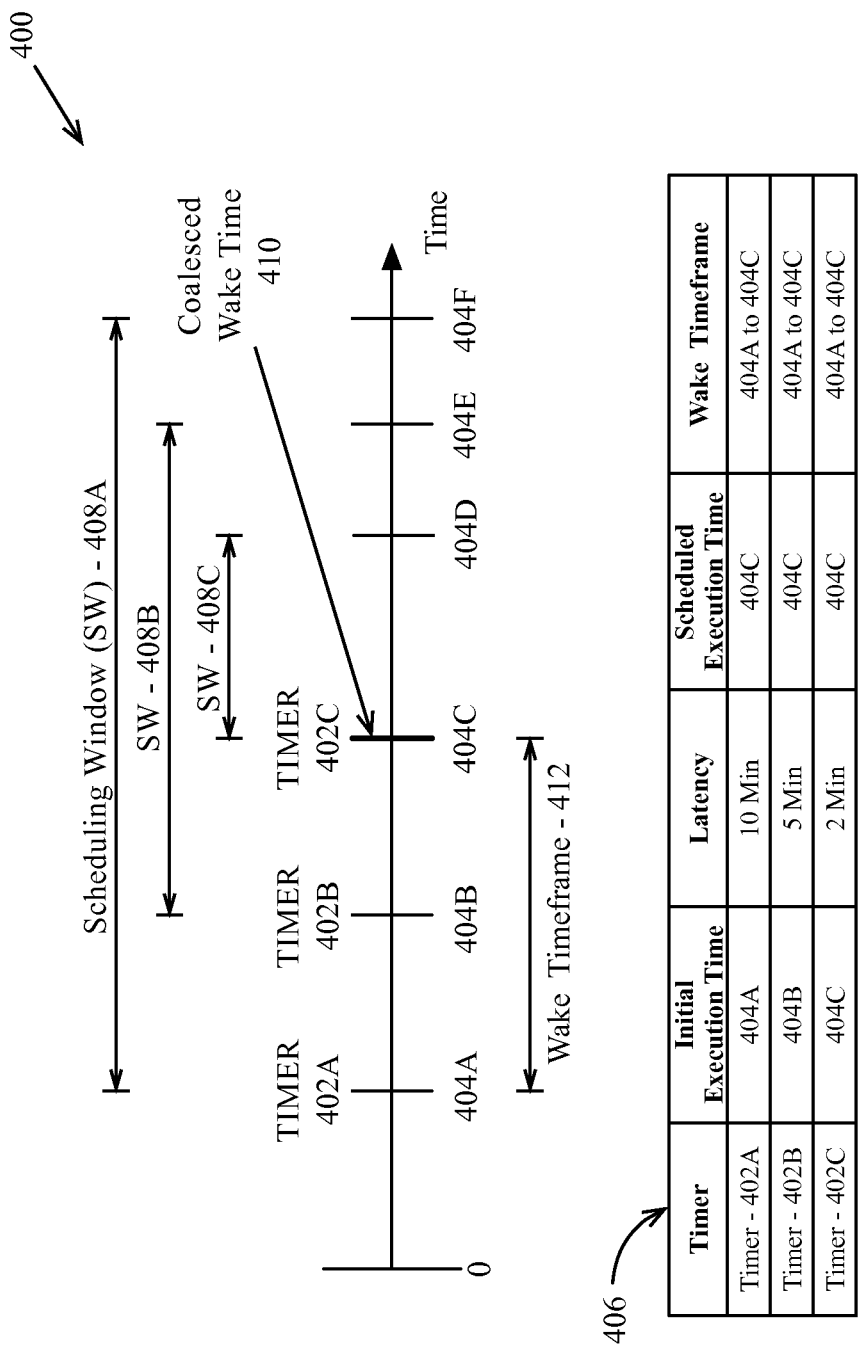
FIG. 4 is an illustration of timer coalescing and wake timeframe determination, according to an embodiment.

FIG. 4 is an illustration of timer coalescing and wake timeframe determination, according to an embodiment. In one embodiment, operating system software on the data processing system manages the execution of timers to reduce the number of timer interrupts caused by the timers. FIG. 4 illustrates a timeline 400, which demonstrates coalescing of timers 402A-C by scheduling these timers 402A-C using scheduling windows (SW) 408A-C for each of these timers 402A-C in one embodiment. Once the individual timers are coalesced, a wake timeframe 412 for the collection of timers can be determined.

In one embodiment, the timers 402A-C illustrated can be coalesced by defining a scheduling window 408A-C for each timer 402A-C based on a latency time associated with the timer. Timer attribute table 406 illustrates three timers 402A-C. Each of the timers 402A-C has an initial execution time, a latency time, and a coalesced execution time. The initial execution time is the time when the timer is initially scheduled to execute. However, instead of having a fixed execution time for each timer, in one embodiment, timer management logic allows the execution of each time to be delayed for up to a latency time that starts to run at the initial execution time. Therefore, the timer management logic can execute a timer at any time between the initial execution time and the initial execution time plus the latency time.

The time range between the initial execution time and the end of the latency time is called a scheduling window for the timer. In one embodiment, the scheduling window defines a time range in which the operating system can delay the execution of the timer. In such embodiment, the scheduling window for each timer 402A-C defined the time range between the scheduled execution time and the scheduled execution time plus the latency time. FIG. 4 identifies several different points of time 404A-F on the timeline 400 to indicate the times, scheduling windows and timeframes associated with the timer.

For example and in one embodiment, timer 402A has an initial execution time of 404A and a latency time of 10 minutes. In one embodiment, the 10 minute latency time indicates to the operating system that it is acceptable to delay timer 402A as much 10 minutes after the requested initial execution time. In such embodiment, timer 402A has a 10 minute scheduling window 408A that spans from times 404A to 404F, representing. Thus, the operating system can schedule timer 402A to trigger between times 404A to 404F. Timer 402B has an initial execution time of 404B and a latency time of 5 minutes. Accordingly, the operating system can schedule timer 402B to trigger between 404B and 404E, as represented by 5 minute scheduling window 408B. Timer 402C has an initial execution time of 404C and a latency of 2 minutes. Accordingly, the operating system can schedule timer 402C to trigger between 404C and 404D, represented by 2 minute scheduling window 408C.

Because each timer has a scheduling window rather than a fixed execution time, the timer management module is able to select an execution time that is within the scheduling windows of multiple timers and schedule those timers to execute at the same selected execution time. For example and in one embodiment, because time 404C is within the scheduling windows 408A-C of the timers 402A-C, the timer management logic can select time 404C as the coalesced wake time 410 and schedule the timers 402A-C to execute at the coalesced wake time 410. By coalescing the execution of the timers 402A-C using the scheduling windows 408A-C, instead of invoking multiple interrupts, the operating system invoke one interrupt to process those multiple timers.

Determining a coalesced wake time 410 additionally enables the timer management logic to determine a wake timeframe 412 for the collection of timers. In one embodiment, the wake timeframe is communicated to processors or device within the system based on the requested resources included in the wake request associated with the timer. For example, if each of the timers 402A-C are associated with a wake request indicating that the process will use network resources after the wake event, the wake timeframe 412 of the coalesced timers is communicated to a network processor associated with the requested network resource (e.g., cellular, WI-FI, Bluetooth, etc.).

Figure 5:
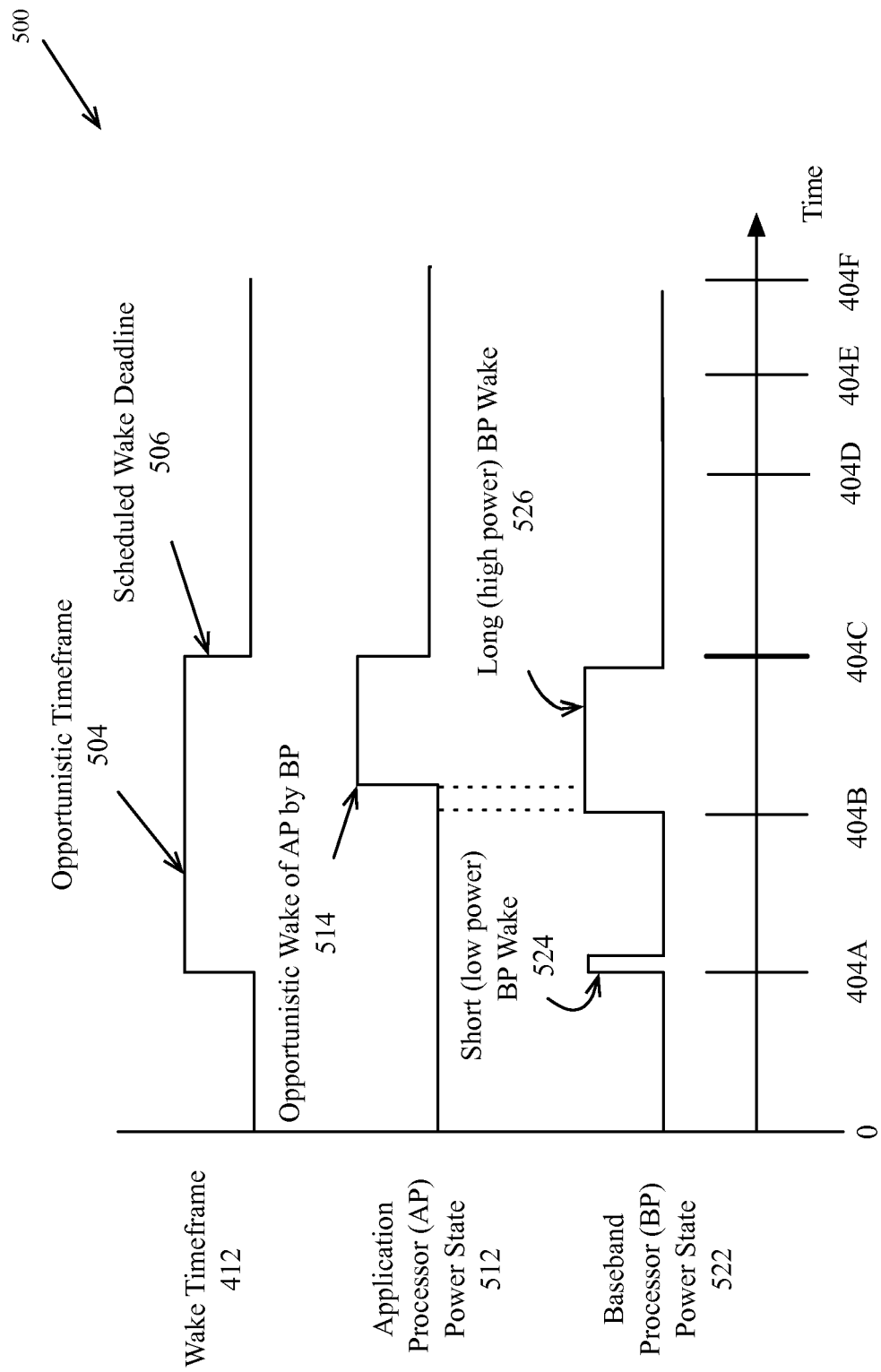
FIG. 5 is an exemplary timeline for the opportunistic waking of an application processor during a baseband processor wake, according to an embodiment.

FIG. 5 is an exemplary timeline 500 for the opportunistic waking of an application processor during a baseband processor wake, according to an embodiment. In various embodiments, a wireless network processor (e.g., wireless network processor 200 as in FIG. 2), which can be a wireless baseband processor, is configured to receive the wake timeframe 412 illustrated in FIG. 4 from one or more of a timer management, power management, or power control logic within a data processing system.

In one embodiment, the wake timeframe 412 includes an opportunistic timeframe 504 and a scheduled wake deadline 506. The opportunistic timeframe 504 is the period of time in which an application processor in a low power sleep state may be opportunistically woken from the low power state and transitioned into an active power state. As illustrated, the opportunistic timeframe 504 begins at time 404A, which is the start of the wake timeframe 412, and ends at time 404C, which is the end of the wake timeframe 412. A scheduled wake deadline 506 occurs at the end of the opportunistic timeframe 504. The scheduled wake deadline 506 is a final deadline by which an application processor will be automatically transitioned into an active power state if no other processors or devices in the system wake the application processor during the opportunistic timeframe 504.

An application processor (AP) power state 512 and baseband processor (BP) power state 522 are also illustrated. Prior to time 404A, the application processor and the baseband processor are each in a low power state. At time 404A, a short, low power BP wake 524 occurs, as reflected by the BP power state 522. In one embodiment, the short BP wake 524 is the result of a discontinuous reception cycle, in which the baseband processor temporarily wakes for a low power state to determine if any network data is available to be received, or if any network connection maintenance activities are to be performed. In one embodiment, although the short BP wake 524 occurs within the opportunistic timeframe 504 of the application processor, the baseband processor does not wake the application processor, as opportunistic waking by the baseband processor is reserved for longer, higher power takes, such as long BP wake 526.

As illustrated, the long BP wake 526 occurs as the result of network activity that is not dependent upon or directly caused by the application processor, such as transitioning between wireless network base stations (e.g., as cellular towers) for a mobile wireless network. In one embodiment, opportunistic waking can be performed during a long BP wake 526. In such embodiment, when the baseband processor enters an active state at 404B, the baseband processor can determine whether the wake time (e.g., 404B) and/or current time is within the opportunistic timeframe 504 of the wake timeframe 412. If the baseband processor performs a long BP wake 526 during the opportunistic timeframe 504, as shown by exemplary timeline 500, the baseband processor can trigger a wake event to cause the application processor to transition into an active state. Once the application processor is in the active state, tasks associated with the wake requests can be performed, including network tasks performed by the baseband processor at the request of the application processor.

The scenario illustrated by the timeline 500 of FIG. 5 is generally preferable to a configuration lacking opportunistic wake capability. In such alternative scenario, the baseband processor may transition back into a low power sleep state at some point prior to the scheduled wake deadline 506 at time 404C, only to be transitioned out of the low power sleep state by the application processor shortly after time 404C upon expiration of the scheduled wake deadline 506. Thus, opportunistic waking of the application processor can be used to reduce the number of power state transitions by a baseband processor, or another wireless network processor described herein.

Figure 6:
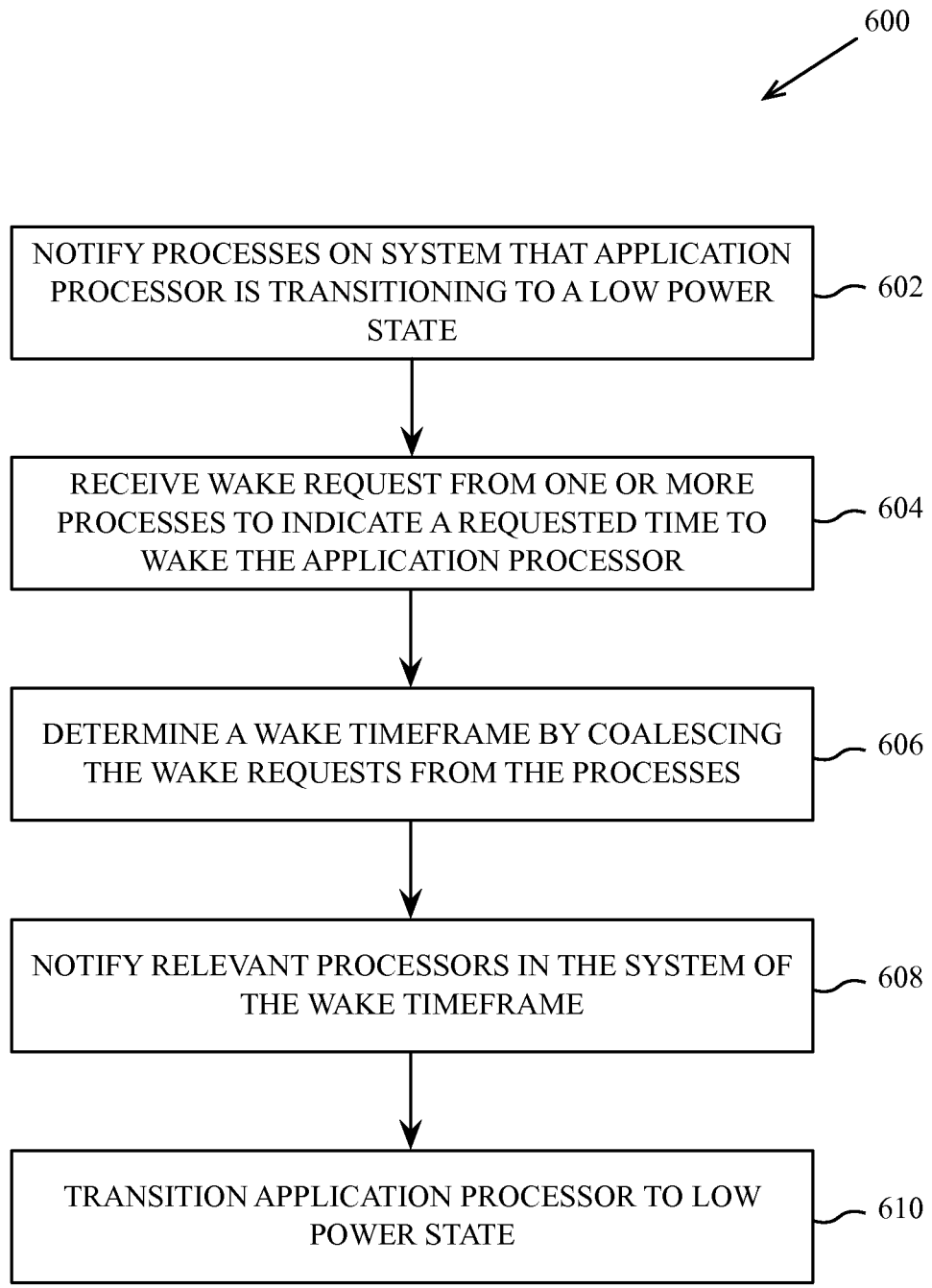
FIG. 6 is a flow diagram of logic to determine an opportunistic wake timeframe and to notify relevant processors within a system of the wake timeframe, according to an embodiment.
Figure 7:
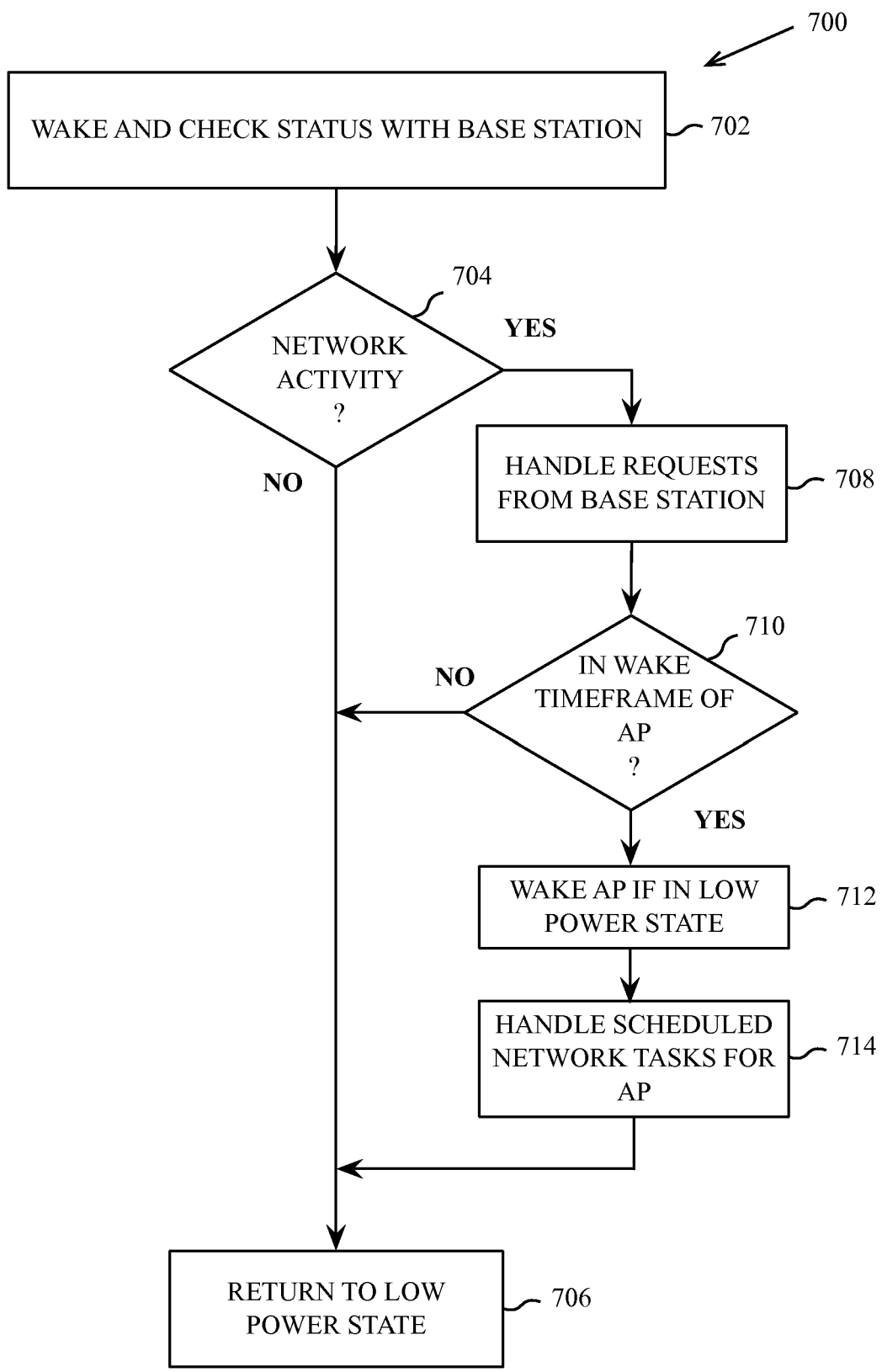
FIG. 7 is a flow diagram of logic on a wireless network processor to perform an opportunistic wake of an application processor, according to an embodiment.

The processes depicted in FIG. 6 and FIG. 7 are performed by processing logic including hardware (e.g. circuitry, dedicated logic, etc.), software (as instructions on a non-transitory machine-readable storage medium), or a combination of hardware and software. Although processes are described below in terms of some sequential operations, it should be appreciated that some of the operations described may be performed in a different order. Moreover, some operations may be performed in parallel rather than sequentially.

FIG. 6 is a flow diagram of logic 600 to determine an opportunistic wake timeframe and to notify relevant processors within a system of the wake timeframe, according to an embodiment. In one embodiment, the logic 600 notifies the processes executing on the system that an application processor is transitioning to a low power state, as shown at block 602. The logic 600 can then receive a wake request from one or more processes in response to the notification, as shown at block 604. The wake request is to indicate a requested time to wake the application processor from the low power state. In one embodiment, the wake request includes a wake margin, which is an allowable latency that may be imposed on the requested time.

The logic 600 can determine a wake timeframe by coalescing the requested wake times within the wake requests, as shown at block 606. As illustrated by the timeline 400 of FIG. 4, in one embodiment the logic coalesces the wake times within the wake requests using the wake margin provided within each wake request, although other embodiments may generate the wake margin based on one or more factors such as a priority associated with the wake request. In one embodiment, the wake timeframe includes an opportunistic timeframe and a scheduled wake deadline. The scheduled wake deadline can be determined using a coalesced wake time (e.g., coalesced wake time 410 of FIG. 4), which is a wake time that lies within the scheduling window of at least two or more of the timers that are to be coalesced. In one embodiment, a real time clock within the system is configured to cause a timer interrupt if the device is not transitioned out of the low power state by the scheduled wake deadline. The opportunistic timeframe portion of the wake timeframe can be determined, in one embodiment, by the earliest time within the set of scheduling windows that are coalesced.

In one embodiment, the logic 600 is further configured at block 608 to notify relevant processors in the system of the wake timeframe determined at block 606. The relevant processors in the system can be determined based on a requested resources included in the wake request received at block 604. In one embodiment, the requested resources include a network resource, such as a mobile data network or wireless LAN, such as a WI-FI or Bluetooth data network, each having an associated wireless network processor, which may be separate network processors or a common network processor that provides multiple forms of wireless network connectivity. The relevant network processors can store the wake timeframe for later use in determining whether to perform an opportunistic wake of the application processor. After the relevant processors within the system are notified of the wake timeframe for the application processor, the logic 600 can transition the application processor to a low power state at block 610.

In various embodiments, a power manager, such the power manager process 336 of FIG. 3, performs at least the power management portion of the logic 600. In one embodiment, a timer manager such as the kernel timer manager 314 of FIG. 3 can perform at least the coalescing portion of the logic at block 606 at the request of the power manager. In one embodiment, the power manager can perform operations to coalesce the timers.

FIG. 7 is a flow diagram of wireless network processor logic 700 to perform an opportunistic wake of an application processor, according to an embodiment. In one embodiment, the logic 700 is executed by a micro-controller on the wireless network processor, such as the microcontroller 222 within the wireless network processor 200 of FIG. 2, or by some other processing element within the wireless network processor.

In one embodiment, the logic 700 performs an operation to wake and check status with a base station, as shown at block 702. The base station can be a wireless base station, such as a cellular or mobile data network base station (e.g., cellular tower), a WI-FI access point, or a connected Bluetooth device. The operations of block 702 are performed, in one embodiment, without the use of the application processor, such that if the application processor is not enabled if the application processor is in a low power state.

In one embodiment, the logic 700 determines at block 704 whether the network processor is to perform network activity, such as performing network maintenance operations, transitioning base stations, and/or receiving or transmitting data over a radio frequency interface (e.g., radio module(s) 112 of FIG. 1). In one embodiment, opportunistic wakes are performed during longer, higher power wireless network processor wakes that are independent of the application processor. For example, any wake event in which network data activity is performed at block 704 can be classified as a long wake event for the wireless network processor. For wake events in which no substantial network activity is to be performed by the network processor at block 704, the logic 700 can cause the network processor to return to a low power state, as shown at block 706. Events in which no substantial activity is to be performed include, for example, discontinuous reception wake event in which a beacon or polling message indicates that no data is waiting to be received by the network processor.

For a long wake event, or a wake event in which substantial network activity is performed by the network processor, as determined at block 704, the logic 700 can be configured to cause the wireless network processor to handle requests from the base station at block 708. Many of these long wake events can be performed without the use of the application processor. For example and in one embodiment, a base station transition such as a handover or handoff from one cellular tower to a different cellular tower can be performed without the use of the application processor within a device. In one embodiment, a WI-FI handoff between access points can be performed without the use of the application processor within the device. Other types of network events may be handled independently of the application processor.

At block 710, the logic 700 can determine if the wake event occurs within the wake timeframe of the application processor. The wake timeframe can be received by the network processor, in one embodiment, as a result of the operations performed by logic 600 at block 608, as shown in FIG. 6. In one embodiment, the logic 700 can determine whether the wake event occurred within the wake timeframe of the application processor by comparing a current system timer or clock to a beginning and end time specified for the wake timeframe. In one embodiment, the logic 700 can determine if the current system timer or clock is within a range of a specified wake time for the application processor. If the logic 700 determines at block 710 that the current time is not within the wake timeframe of the application processor, the logic 700 can return the network processor to a low power state at block 706.

In one embodiment, if the logic 700 determines at block 710 that the current time is within the wake timeframe, the logic 700 can perform an opportunistic wake of the application processor if the application processor is in a low power state at block 712. After waking the application processor at block 712, the logic 700 can enable the network processor to handle any scheduled network tasks at the request of the application processor at block 714. Once the scheduled network tasks are performed, the logic 700 can return the network processor to a low power state at block 706.

In some embodiments it is possible for the application processor to wake due to some other event, such that the application processor is already awake after the logic 700 determines that the current time is within the wake timeframe of the application processor. In such an event, the logic 700 may not wake the application processor at block 712, as the application processor is no longer in a low power state. However, because the logic 700 is aware that the network processor is in an active power state during the wake timeframe of the application processor, the logic 700 can, in one embodiment, delay the return to the low power state at block 706 until the network processor can handle any scheduled network tasks at block 714.

Figure 8:
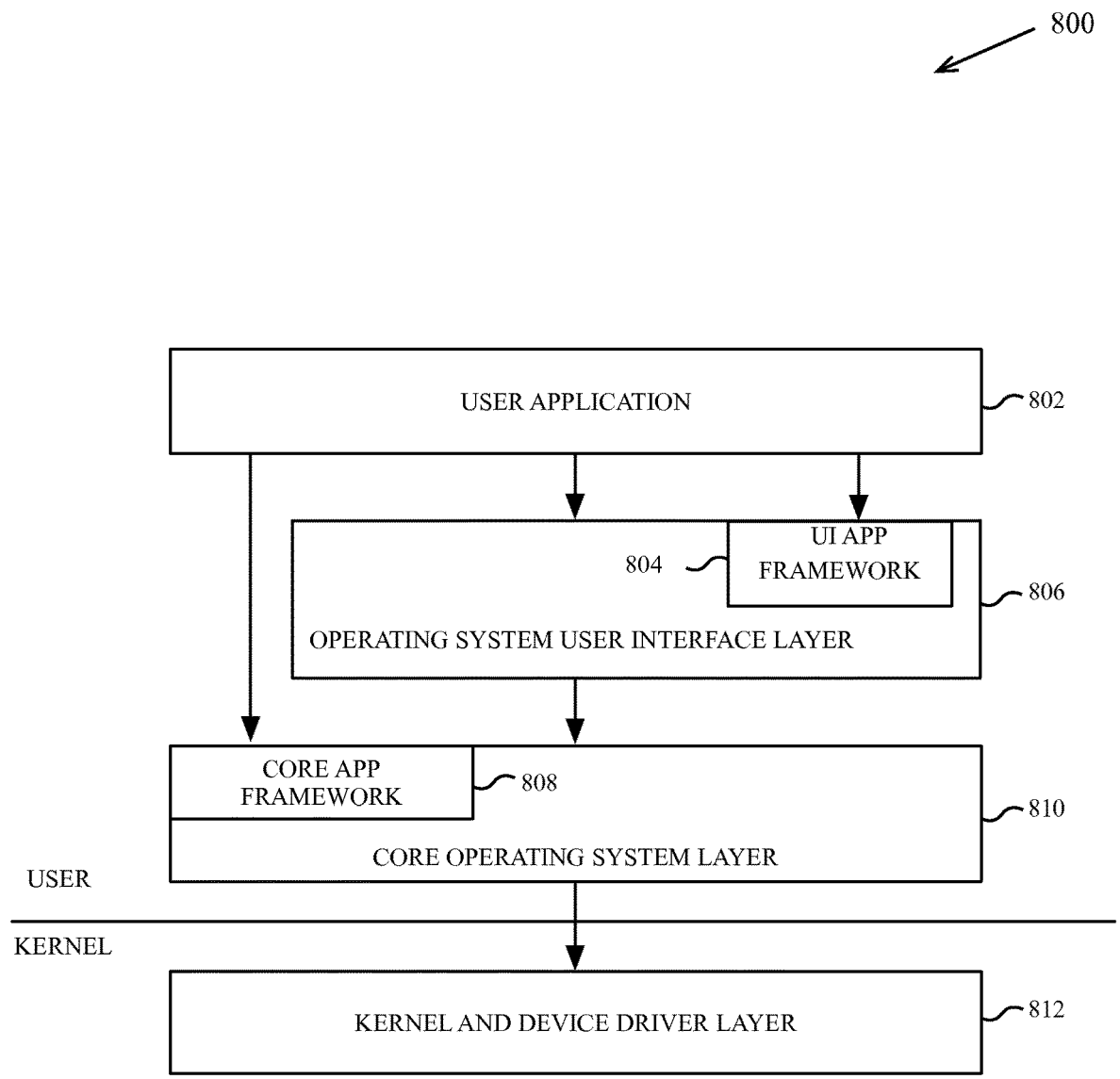
FIG. 8 is a block diagram of a multi-layer software architecture used by a data processing system, according to an embodiment.

FIG. 8 is a block diagram of a multi-layer software architecture 800 used by a data processing system, according to an embodiment. The software components are illustrated with a division between user space and a kernel space. Although other arrangements are possible, user applications (e.g., user application 802), and some operating system components (e.g., operating system user interface layer 806, and the core operating system layer 810) execute in user space. In kernel space, the operating system kernel and a set of device drivers operate in the kernel and device driver layer 812. The kernel and device driver layer 812 manage the underlying functionality of the overall operating system and provide a formalized and secure mechanism for user space software to access data processing system hardware.

A user interface (UI) application framework 804 provides a mechanism for the user application 802 to access UI services provided by the operating system (OS) UI layer 806. Underlying operating system functions that are not related to the user interface are performed in the core operating system layer 810. One or more data management frameworks, such as a core app framework 808 can be made available to a user application to facilitate access to operating system functions.

The exemplary user application 802 may be any one of a plurality of user applications, such as a web browser, a document viewer, a picture viewer, a movie player, a word processing or text editing application, an email application, or other applications known in the art. Each user application 802 can include one or more processes or tasks. Each process or task can spawn multiple threads. The user application 802 accesses instructions in an exemplary UI app framework 804 for creating and drawing graphical user interface objects such as icons, buttons, windows, dialogs, controls, menus, and other user interface elements. The UI application framework 804 also provides additional functionality including menu management, window management, and document management, as well as file open and save dialogs, drag-and-drop, and copy-and-paste handling.

The core operating system layer 810 contains operating system components that implement features including and related to application security, system configuration, graphics and media hardware acceleration, and directory services. Multiple application frameworks, including the core app framework 808, provide a set of APIs to enable a user application 802 to access core services that are essential to the application, but are not directly related to the user interface of the application. The core app framework 808 can facilitate an application's access to database services, credential and security services, backup services, data synchronization services, and other underlying functionality that may be useful to an application.

The core app framework 808, or equivalent application frameworks, can provide access to remote server based storage for functionality including synchronized document storage, key-value storage, and database services. Key-value storage allows a user application 802 to share small amounts of data such as user preferences or bookmarks among multiple instances of the user application 802 across multiple client devices. The user application 802 can also access server-based, multi-device database solutions via the core app framework 808.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 9:
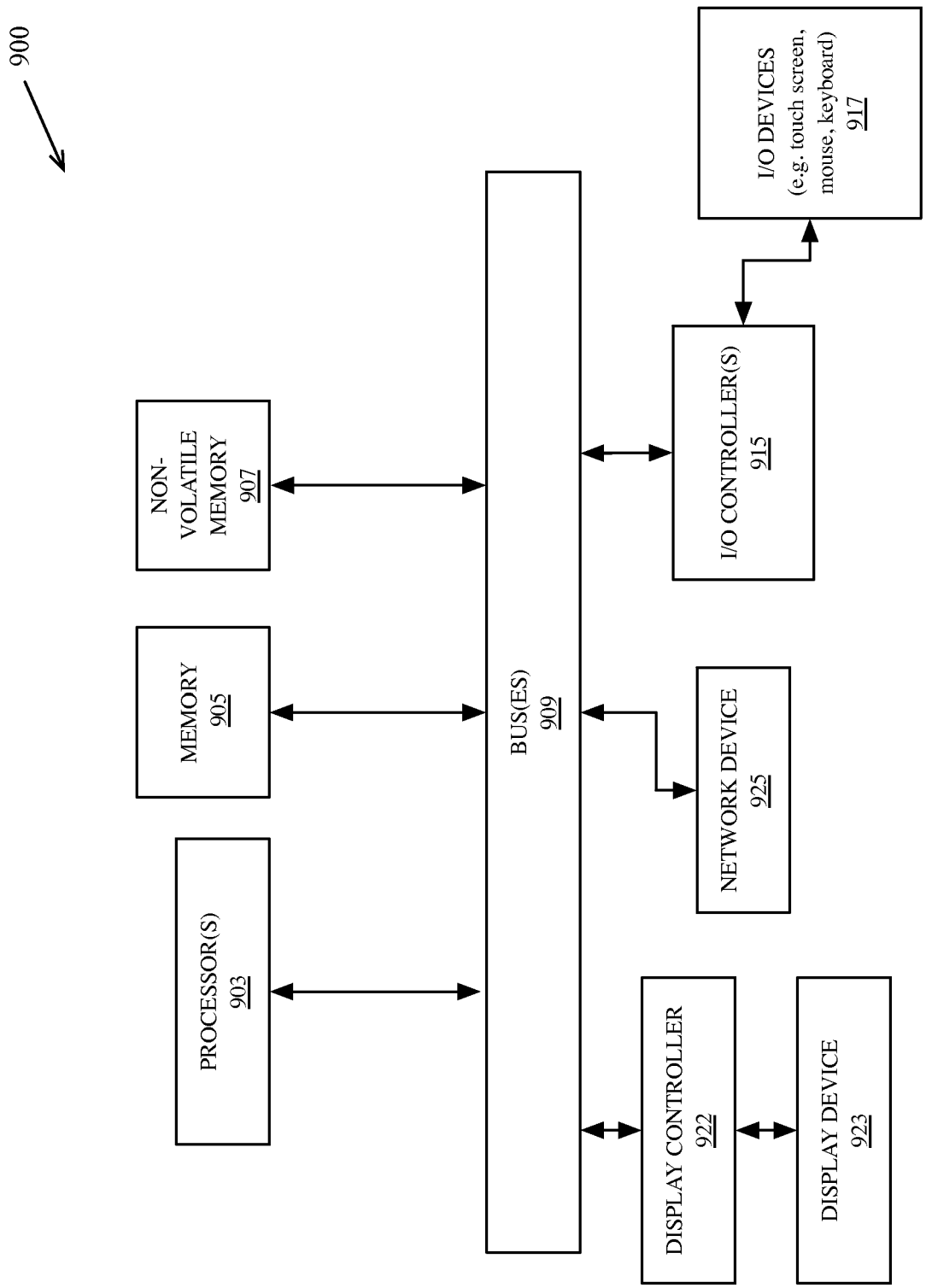
FIG. 9 is a block diagram of data processing system hardware according to an embodiment.

FIG. 9 is a block diagram of data processing system hardware 900 according to an embodiment. Note that while FIG. 9 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown can also be used within the various embodiments.

The data processing system 900 includes one or more bus(es) 909 that serve to interconnect the various components of the system. One or more processors 903 are coupled to the one or more bus(es) 909 as is known in the art. Memory 905 may be volatile DRAM or non-volatile RAM, such as NOR flash memory or other types of high-speed, non-volatile, execute-in-place memory. This memory can be coupled to the one or more bus(es) 909 using techniques known in the art. The data processing system can also includes explicitly non-volatile memory 907, including data storage devices including one or more hard disk drives, flash memory devices or other types of memory systems that maintain data after power is removed from the system. The non-volatile memory 907 and the memory 905 can each couple to the one or more bus(es) 909 using known interfaces and connection techniques. A display controller 922 can couple to the one or more bus(es) 909 to receive display data, which can be displayed on a display device 923. In one embodiment the display device 923 includes an integrated touch input to provide a touch screen.

The data processing system can also include one or more input/output (I/O) controllers 915 which provide interfaces for one or more I/O devices, such as one or more mice, touch screens, touch pads, joysticks, and other input devices including those known in the art and output devices (e.g. speakers). The input/output devices 917 are coupled through one or more I/O controllers 915 as is known in the art.

While the system 900 illustrates the memory 905 and non-volatile memory 907 as coupled to the one or more buses directly, in one embodiment the non-volatile memory 907 can be remote from the system 900, such as in a network storage device which is coupled to the data processing system through a network interface such as a modem, wireless LAN, or Ethernet interface. The bus(es) 909 can be connected to each other through various bridges, controllers and/or adapters as is well known in the art. In one embodiment the I/O controller 915 includes one or more of a USB (Universal Serial Bus) adapter for controlling USB peripherals or a Thunderbolt controller for controlling Thunderbolt peripherals. In one embodiment, one or more network device(s) 925 can be coupled to the bus(es) 909. The network device(s) 925 can be wired network devices (e.g., Ethernet) or wireless network devices (e.g., WI-FI, Bluetooth).

Figure 10:
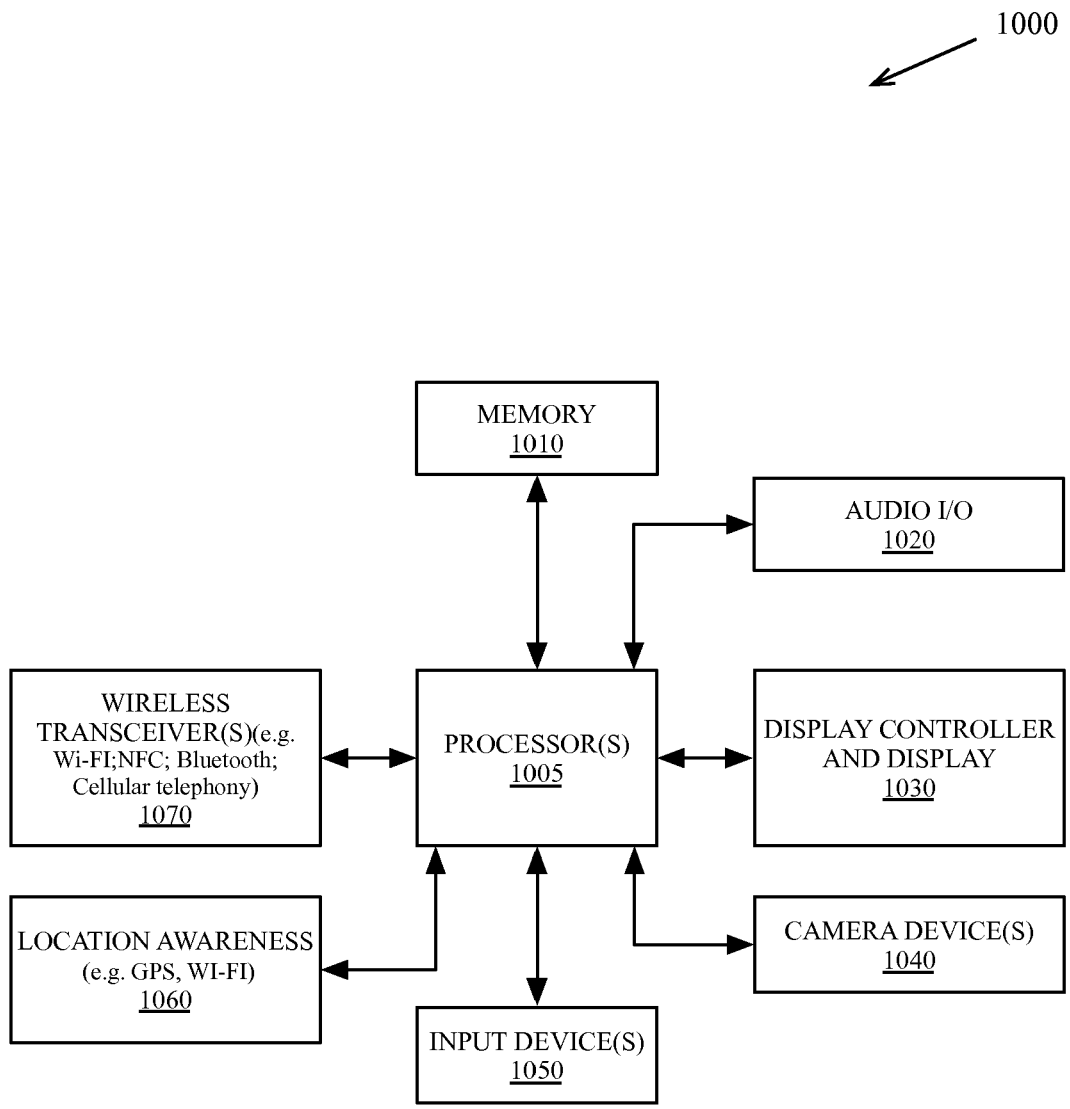
FIG. 10 is a block diagram of an additional data processing system, according to an embodiment.

FIG. 10 is a block diagram of an additional data processing system 1000, according to an embodiment. The data processing illustrated can include hardware components that are optimized for use in mobile or handheld devices, and may be included within a system on a chip integrated circuit. One or more buses or interfaces that are not shown can be used to interconnect the various components, as known in the art. An electronic device constructed using the illustrated data processing system may include additional or fewer components than shown.

The data processing system 1000 can include a processing system having one or more processor(s) 1005, as well as memory 1010 for storing data and programs for execution. The system can include a processing system 1005 having one or more microprocessors and memory 1010 for storing data and programs for execution by the processing system. An audio I/O subsystem 1020 can also be included. The audio I/O subsystem can include a microphone and a speaker for telephone or video conferencing or for the recording and playback of music.

A display controller and display device 1030 can be included to provide a graphical user interface for the user, and a wireless transceiver 1070 may be available to transmit and receive data via one or more wireless technologies, such as Wi-Fi, infrared, Bluetooth, or one or more additional forms of wireless radio technology such as near field communication (NFC) or cellular communications technologies such as UMTS, LTE, CDMA, HSPA, or other wireless communication standards known in the art. The system can contain one or more camera devices 1040 in both a front and rear facing configuration, though similarly configured systems each with only a front facing camera or rear facing camera can be one of many optimal configurations. The data processing system 1000 also includes one or more input devices 1050 to enable a user to provide input to the system. Input devices may include a keypad or keyboard, alone or in conjunction with a touch or multi touch panel that is overlaid on the display device 1030. The display device and touch panel can be adjusted in real time using factory-generated calibration data described herein. The data processing system can also include a device for providing location awareness services 1060 via a Global Positioning System (GPS) device, WI-FI location awareness, or an equivalent service.

It will be apparent from this description that aspects of the present invention may be embodied, at least in part, in software. That is, the techniques may be carried out in a data processing system in response to its processor executing a sequence of instructions contained in a storage medium, such as embody a non-transitory machine-readable storage medium. In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

In the specification above, various embodiments were described for techniques to coordinate network processor long wakeup events that are due to radio or network activity with network processor long wakeup events that are due to requests from an application processor. The coordination can reduce the number of long wakeups by wireless network processors within the device, resulting in an overall reduction in device energy consumption. In some circumstances, system responsiveness can be improved due to the pre-emptive coordination of wireless network processor and application processor power cycles.

One embodiment provides for a computer implemented method comprising notifying one or more processes of a data processing system that at least one of the one or more processors is to transition to a low power state; receiving one or more wake requests from the one or more processes to indicate a period in which to wake the at least one processor; determining a wake timeframe by coalescing the one or more wake requests; and notifying a network processor of the wake timeframe, wherein the network processor is to wake the at least one processor upon waking from a low power state within the wake timeframe of the at least one processor.

A further embodiment provides for configuring a real-time clock to wake the at least one processor at a determined time within the wake timeframe, wherein the network processor is to wake the at least one processor from the low power state before the determined time. In a further embodiment, the one or more wake requests include a wake time, a wake margin, and a resource to use upon wake. A further embodiment additionally provides for transitioning a network processor to a low power state; waking the network processor from the low power state in response to an external network event; performing a network maintenance event via the network processor after waking the network processor from the low power state; after performing the network maintenance event, determining whether current time is within the wake timeframe and whether the one or more application processors are in the low power state; and causing, in response to the determination, the one or more application processors to wake from the low power state before the determined wake time. A still further embodiment provides for performing an activity associated with at least one of the one or more wake requests after the one or more application processors wake from the low power state.

One embodiment provides for a data processing system comprising one or more application processors; a wireless network processor coupled with the one or more application processors, where the wireless network processor is to process network data on behalf of the one or more application processors; and power management logic to determine a wake timeframe for the one or more application processors, communicate the wake timeframe to the wireless network processor, and cause the one or more application processors to transition to a low power state.

In a further embodiment the data processing system additionally comprises one or more real-time clocks and the power management logic is further to program at least one of the real-time clocks to wake the one or more application processors from the low power state at a determined wake time within the wake timeframe. In one embodiment, notifying the network processor of the wake timeframe includes determining whether the one or more wake requests includes a resource provided by the network processor and, upon the determining, notifying the network processor of the wake timeframe. In a further embodiment, the network processor is configured to process incoming network information upon waking from the low power state and wake the at least one processor before the determined time to perform network processing on behalf of at least one of the one or more processes executing on the at least one processor.

In one embodiment, the wireless network processor is additionally configured to transition to a low power state; wake from the low power state in response to an external network event; perform a network maintenance event after waking from the low power state; after performing the network maintenance event, determine whether current time is within the wake timeframe and whether the one or more application processors are in the low power state; and in response to the determination, cause the one or more application processors to wake from the low power state before the determined wake time.

In one embodiment the power management logic of the data processing system is further to receive one or more wake requests in response to a notice to one or more processes executing on the one or more application processors of an impending transition of the one or more application processors to the low power state. In a further embodiment, the one or more wake requests include a wake time, a wake margin, and a resource. In a further embodiment, the power management logic is configured to determine the wake timeframe for the one or more application processors by coalescing the one or more wake requests based on the wake time and wake margin of each request before communicating the wake timeframe to the network processor. In a further embodiment, the power management logic is configured to communicate the wake timeframe to the wireless network processor when the one or more wake requests include a resource provided by the wireless network processor.

In one embodiment the wireless network processor of the data processing system includes one or more of a cellular baseband processor and/or wireless wide area network processor (WWAN) or a wireless local area network (WLAN) processor that includes a Bluetooth or WI-FI network processor. In a further embodiment the wireless network processor is configured to transition to a low power state during a discontinuous reception cycle and wake from the low power state to process network traffic. In a further embodiment the one or more application processors execute a first operating system and the wireless network processor executes a second operating system that is different from the first operating system.

One embodiment provides for an electronic device comprising application processor and a network processor. The network processor can receive a wake timeframe of the application processor, where the wake timeframe includes a scheduled wake deadline and an opportunistic timeframe. The network processor can be configured to enter and wake from a low power state and, upon waking from the low power state, to determine whether a current time is within the wake timeframe of the application processor. The network processor, upon a determination that the current time is within the opportunistic timeframe can cause the application processor to wake from a low power state prior to the scheduled wake deadline. In one embodiment, the application processor of the device is configured to enter and wake from a low power state and the scheduled wake deadline indicates when the application processor is to wake from a low power to perform a network operation via the network processor.

In one embodiment the network processor is a wireless network processor configured to wake from the low power state in response to a network event received via a wireless receiver. In such embodiment, the wireless network process can wake from the low power state in response to a network event received via a wireless receiver. In one embodiment, the network event is a base station transition. In various embodiments, a base station transition is a handoff or a handover between mobile base stations, wireless access points, and/or other connected network devices, or any other network event that may otherwise be handled without waking the application processor. In one embodiment, the wireless network processor is a wireless baseband processor having support for one or more cellular and/or wireless wide area networks (WWAN), wireless local area network (WLAN) processor, and/or a Bluetooth network processor.

One embodiment provides for a non-transitory machine-readable medium storing instructions which, when performed by one or more processors of a data processing system, cause the one or more processors to perform operations comprising notifying one or more processes of the data processing system that at least one of the one or more processors are to transition to a low power state; receiving one or more wake requests from the one or more processes to indicate a period in which to wake the at least one processor; determining a wake timeframe by coalescing the one or more wake requests; and notifying a network processor of the wake timeframe, wherein the network processor is to wake the at least one processor upon waking from a low power state within the wake timeframe of the at least one processor. A further embodiment provides for configuring a real-time clock to wake the at least one processor at a determined time within the wake timeframe, wherein the network processor is to wake the at least one processor from the low power state before the determined time. In a further embodiment, the one or more wake requests include a wake time, a wake margin, and a resource to use upon wake.

In one embodiment, notifying the network processor of the wake timeframe includes determining whether the one or more wake requests includes a resource provided by the network processor and, upon the determining, notifying the network processor of the wake timeframe. In a further embodiment, the network processor is configured to process incoming network information upon waking from the low power state and wake the at least one processor before the determined time to perform network processing on behalf of at least one of the one or more processes executing on the at least one processor.

Besides what is described herein, various modifications can be made to the disclosed embodiments and implementations without departing from their scope. Therefore, the illustrations and examples herein should be construed in an illustrative, and not a restrictive sense. The scope and spirit of the various embodiments should be measured solely by reference to the claims that follow.

What is claimed is:

1. A method comprising:
   executing one or more processes on a data processing system having one or more processors, wherein at least one of the one or more processors is to transition to a low-power state;
   receiving a plurality of wake requests from the one or more processes to indicate a period in which to wake the at least one processor, wherein each of the plurality of wake requests includes a wake time;
   determining a wake timeframe by coalescing the plurality of wake requests into a processor wake request using at least the wake times of the plurality of wake requests;
   coordinating the wake timeframe with a long wake timeframe of a network processor that has both the long wake timeframe and a short wake timeframe to coalesce the wake timeframe into the long wake timeframe and not the short wake timeframe; and
   notifying the network processor of the wake timeframe, wherein the network processor is to wake the at least one processor upon the network processor waking from a low-power state during one of the long wake timeframes when the processor wake request is within one of the long wake timeframes.

2. The method as in claim 1, wherein the at least one processor is an application processor.

3. The method as in claim 1, wherein the long wake timeframe is associated with a long wake and the short wake timeframe is associated with a short wake.

4. The method as in claim 3, wherein the long wake is more energy intensive than the short wake.

5. The method as in claim 3, wherein the long wake is longer than the short wake.

6. The method as in claim 3, wherein the long wake is used to perform network connection activities.

7. The method as in claim 3, wherein the short wake is used to perform an action selected from the group consisting of determining if any network communication maintenance is to be performed and checking for network data.

8. The method as in claim 3, wherein the short wake does not involve the at least one processor.

9. The method as in claim 1, wherein a timer is configured to wake the at least one processor.

10. The method as in claim 9, wherein the timer provides the operating system with a time-driven interrupt source to trigger periodic activity.

11. A non-transitory machine-readable medium storing instructions which, when performed by one or more processors of a data processing system, cause the one or more processors to perform operations comprising:
    executing one or more processes on a data processing system having one or more processors, wherein at least one of the one or more processors is to transition to a low-power state;
    receiving a plurality of wake requests from the one or more processes to indicate a period in which to wake the at least one processor, wherein each of the plurality of wake requests includes a wake time;
    determining a wake timeframe by coalescing the plurality of wake requests into a processor wake request using at least the wake times of the plurality of wake requests;
    coordinating the wake timeframe with a long wake timeframe of a network processor that has both long wake timeframes and short wake timeframes to coalesce the wake timeframe into the long wake timeframe and not the short wake timeframe; and
    notifying the network processor of the wake timeframe, wherein the network processor is to wake the at least one processor upon the network processor waking from a low-power state during one of the long wake timeframes when the processor wake request is within one of the long wake timeframes.

12. The non-transitory machine-readable medium as in claim 11, wherein the at least one processor is an application processor.

13. The non-transitory machine-readable medium as in claim 11, wherein the long wake timeframe is associated with a long wake and the short wake timeframe is associated with a short wake.

14. The non-transitory machine-readable medium as in claim 13, wherein the long wake is more energy intensive than the short wake.

15. The non-transitory machine-readable medium as in claim 13, wherein the long wake is longer than the short wake.

16. The non-transitory machine-readable medium as in claim 13, wherein the long wake is used to perform network connection activities.

17. The non-transitory machine-readable medium as in claim 13, wherein the short wake is used to perform an action selected from the group consisting of determine if any network communication maintenance is to be performed and check for network data.

18. The non-transitory machine-readable medium as in claim 13, wherein the short wake does not involve the at least one processor.

19. The non-transitory machine-readable medium as in claim 1, wherein a timer is configured to wake the at least one processor.

20. The non-transitory machine-readable medium as in claim 19, wherein the timer provides the operating system with a time-driven interrupt source to trigger periodic activity.

* * * * *